Dec. 10, 1957  W. C. MORROW  2,815,707
BARBECUE
Filed July 6, 1954
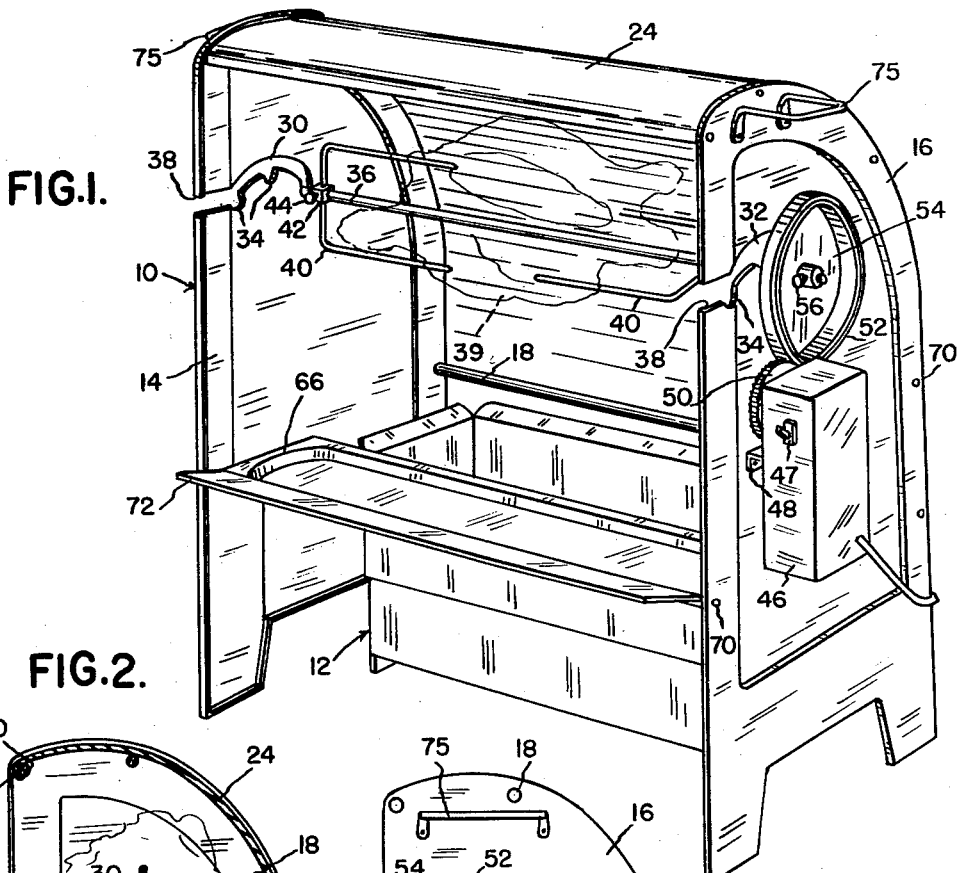
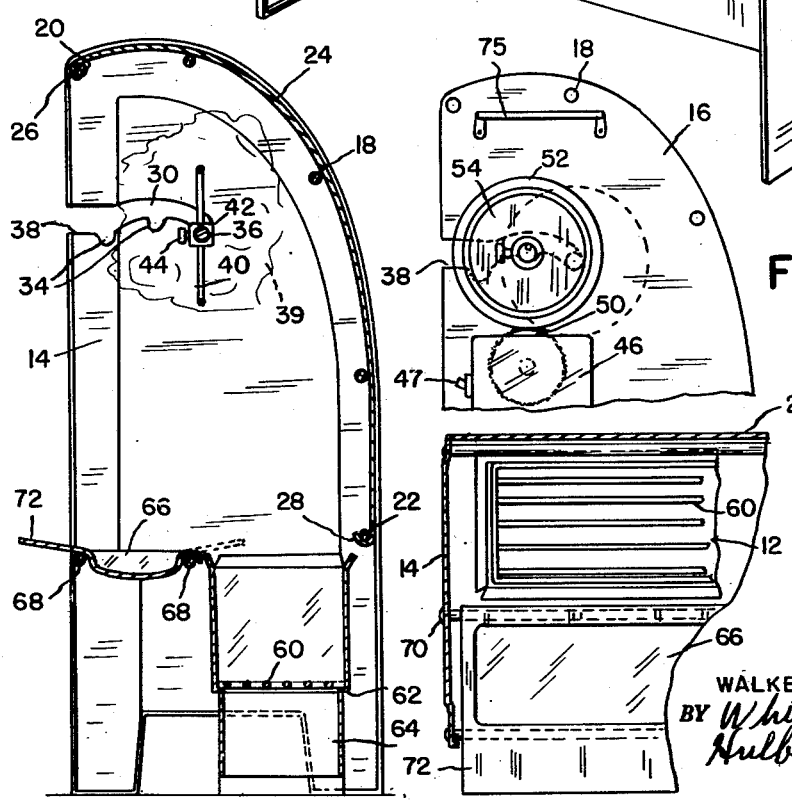
INVENTOR.
WALKER C. MORROW
BY Whittemore,
Hulbert & Belknap
ATTORNEYS

United States Patent Office 2,815,707
Patented Dec. 10, 1957

2,815,707

BARBECUE

Walker C. Morrow, Dearborn, Mich.

Application July 6, 1954, Serial No. 441,311

10 Claims. (Cl. 99—421)

This invention relates to a barbecue and more particularly to a barbecue which employs the pit principle together with a reflector oven.

One object of the invention is to provide a barbecue which incorporates means for supporting the spit in a plurality of selected positions with respect to the fire pot so that the meat on the spit may be arranged to obtain the desired cooking action under different fire conditions.

As a feature of this invention, the reflector oven is formed of a pair of laterally spaced uprights which are provided with arcuate slots having spaced notches for receiving the opposite ends of the spit. A motor is mounted on one of the uprights having a driving wheel for rotating a driven wheel fixed on the spit. The notches are arranged along a circle which is concentric with the driving wheel axis so that the driving and driven wheels will be in driving engagement when the spit is rotatably supported in any of the notches.

Another object of the invention is to provide a barbecue having a reflector oven provided with a removable reflector hood. The hood is readily removable to facilitate cleaning.

Another object of the invention is to provide a reflector hood which is formed of an inexpensive disposable material such as aluminum foil which may be thrown away after using, thereby eliminating the necessity for cleaning the hood.

Still another object of the invention is to provide a barbecue having a removable drip tray supported beneath the spit for receiving drippings from the meat as it cooks. The drip tray is provided with a somewhat inclined generally horizontal lip along one edge and the drip tray is both removable and reversible permitting the same to be readily cleaned and also permitting it to be turned so that the lip extends either forwardly or rearwardly as desired, depending on the adjusted position of the spit.

A further object of the invention is to provide a barbecue which is portable, easy to operate, and composed of a relatively few inexpensive parts which may be readily assembled and disassembled.

Other objects of the invention will become apparent as the following description proceeds, especially when taken in conjunction with the accompanying drawing wherein:

Figure 1 is a perspective view of a barbecue embodying the principles of the present invention;

Figure 2 is a vertical longitudinal sectional view of the structure shown in Figure 1;

Figure 3 is a side elevational view of a portion of the structure shown in Figure 1; and Figure 4 is a fragmentary horizontal sectional view.

Referring now more particularly to the drawing, and especially to Figure 1 thereof, the barbecue there illustrated comprises a reflector oven generally indicated at 10 and an open-topped box-like fire pot generally indicated at 12. The oven comprises a pair of laterally spaced uprights 14 and 16 which define side walls, these uprights being detachably interconnected by a plurality of rods 18 extending therebetween. The rods are mutually parallel and are arranged in spaced apart relation along the upper and rear edges of the uprights. The rod 20 is located at the upper front corner of the uprights and the rod 22 is located at the rear edge of the uprights at a point spaced a considerable distance from the bottom thereof. The other rods are arranged in a spaced series intermediate the rods 20 and 22, all of the rods serving as a means for supporting a removable deflector hood 24.

The hood 24 may be formed of flexible sheet metal such as aluminum, for example, and the front and rear edges of the hood are shaped to provide inwardly turned and return bent portions 26 and 28 which respectively engage over the rods 20 and 22. The hood may obviously be easily attached in place and removed after use for cleaning.

The uprights are formed with the generally horizontal slots 30 and 32 which are in substantial alignment with each other. In detail, these slots are arcuately shaped and are formed with a plurality of spaced notches 34 in their lower sides, the notches of one slot being respectively aligned with notches of the other slot to rotatably receive the opposite ends of the turning rod or spit 36. It will be apparent that the spit may be easily moved through the slots and supported in any pair of notches to obtain the desired cooking action. In addition, these slots are open at the front edges of the uprights as indicated at 38 to facilitate the removal of the spit for cleaning and for removing the meat 39 from the spit.

The U-shaped members 40 provide forks at opposite ends of the spit having the free ends or tines extending inwardly for piercing the meat on the spit and thereby preventing the latter from turning relative to the spit. These members 40 are fixed in the blocks 42 which latter are sleeved on the spit for rotation and longitudinal sliding movement. A set screw 44 threaded in each block is adapted to be advanced into engagement with the spit to lock the members 40 against movement relative to the spit.

Referring now to Figures 1 and 3, an electric motor unit 46 is mounted on the outer side of upright 16 by an attaching bracket 48, the motor unit having an on-off switch 47 and an output or driving wheel 50 which is formed with a knurled periphery. The knurled periphery of the driving wheel 50 engages the rubber tire 52 on the driven wheel 54 which is fixed upon the adjacent end of the spit by a set screw 56. The motor unit may desirably be designed to drive the spit at approximately 4 R. P. M. although obviously it may be geared to drive it at any desired speed.

It will be noted that the arcuate slots, and also the notches, are arranged along a circle which is concentric with the driving wheel axis, so that the driving wheel 54 and driven wheel 50 will be in driving engagement when the spit is rotatably supported in any pair of notches.

In instances where electricity is unavailable for operating the motor unit, the set screw 56 may be loosened to permit shifting the driven wheel axially along the spit and out of engagement with the driving wheel 50, permitting the spit to be turned by hand.

The reflector oven is shown in the drawing in association with a fire pot 12 which is located between the uprights and beneath the spit. The fire pot 12 is preferably formed of a heavy gage steel and has a grate 60 supported upon a shoulder 62 formed around the periphery of the fire pot, and an ash pit 64 is provided beneath the grate which has a perforated bottom wall for draft. Charcoal or other suitable solid fuel may be burned in the fire pot. It will be noted that the fire pot is not attached to the reflector oven. The fire pot may thus be used separately for making coffee, for frying or cooking with a skillet, or in other instances where the reflector oven is not required or desired. A fire may be most conveniently started in the fire pot by moving the reflector oven out of the way. When the fire is ready for cooking, the portable reflector oven may then be merely placed over the fire pot in the relationship shown in the drawing.

A drip tray 66 is removably supported on the rods 68 which extend between the uprights and are removably secured to the uprights in the same manner as the rods 18. In detail, the rods have their opposite ends formed with longitudinally extending tapped openings and the headed fasteners 70 extend through openings in the uprights and threadedly engage in the tapped openings. All of the rods are secured to the uprights in this way and therefore are easily detachable to permit the entire structure to be disassembled and carried about in a small package.

The drip tray 66 is formed with a horizontally extending and somewhat inclined lip 72 and the drip tray and lip are provided for receiving drippings from the meat on the spit. Since the drip tray merely rests upon the rods 68, it is apparent that the same is reversible and may be turned to the position shown in dotted lines in Figure 2, if desired.

The operation of the barbecue thus described should be readily apparent. After a piece of meat is placed on the spit, the spit may be inserted into the slots 30 and 32 through the open ends thereof and journaled in the selected pair of aligned notches. A fire is built in the fire pot and the oven is then placed over the fire pot at the relationship shown in the drawing, and the motor unit 46 is started by means of the switch 47 to rotate the spit. The drip tray will, of course, be positioned with its lip extending either forwardly or rearwardly, depending upon the position of the spit.

Since the pit principle is employed, together with a reflector oven, faster cooking with lower heat is permitted since the meat is heated by radiation from the charcoal and the reflecting hood and at the same time is turning in a superheated chamber of air trapped by the oven. The alternate cooling of the meat on one side while the other side is heating is practically eliminated, and thus the meat is cooked thoroughly without burning and in less time.

It is contemplated that the reflector hood may be in the form of a heavy duty aluminum foil which may be preferred by many users since its surface makes a brilliant reflector and yet the material is inexpensive and may be thrown away after using, thus saving the time and bother of cleaning the hood. The aluminum foil may be applied to the oven in the manner shown in Figure 2.

The lift handles 75 on the uprights provide a convenient means for moving the reflector oven from place to place.

The barbecue is preferably made with heavy gage aluminum side walls or uprights and heavy gage aluminum drip tray, rustless steel rods, spit and fork and heavy gage steel fire pot.

The drawing and the foregoing specification constitute a description of the improved barbecue in such full, clear, concise and exact terms as to enable any person skilled in the art to practice the invention, the scope of which is indicated by the appended claims.

What I claim as my invention is:

1. In a barbecue, a pair of laterally spaced uprights, an elongated spit extending between said uprights, supporting means on said uprights for removably supporting opposite ends of said spit in selected positions of adjustment, said supporting means comprising generally horizontal slots on said uprights in substantial alignment with each other, a plurality of spaced notches in the bottoms of said slots for rotatably receiving the ends of said spit, a motor mounted on one of said uprights having a driving wheel, a driven wheel fixed on one end of said spit with its periphery in driving engagement with said driving wheel, said slots being circular and the notches of each slot being disposed in a circular array having its center of curvature coincident with the axis of said driving wheel.

2. Structure as defined in claim 1 in which said slots are each open at one end.

3. In a barbecue, a pair of laterally spaced uprights providing side walls, a series of spaced, mutually parallel rods extending between said uprights and having their opposite ends respectively removably secured to said uprights at spaced points along the upper and rear marginal edge portions of said uprights, a hood of flexible heat reflecting sheet material extending between said uprights in overlying relation to said rods and having return bent portions at its front and rear ends respectively engaging over the rods at opposite ends of the series of rods, said hood being removable by slightly flexing the return bent end portions to clear the rods at opposite ends of the series of rods, and a spit extending between said uprights beneath said hood.

4. In a barbecue, a pair of laterally spaced uprights providing side walls, a series of spaced mutually parallel rods extending between said uprights and having their opposite ends respectively secured removably to said uprights at spaced points along the upper and rear marginal edge portions of said uprights, a hood of flexible heat reflecting aluminum foil extending between said uprights in overlying relation to said rods and having the front and rear end portions thereof folded over the rods at opposite ends of the series of rods, said hood being removable by unfolding the end portions thereof to clear the rods at opposite ends of the series of rods, and a spit extending between said uprights beneath said hood.

5. In a barbecue, a pair of laterally spaced uprights providing side walls, a series of spaced, mutually parallel rods extending between said uprights and having their opposite ends respectively removably secured to said uprights at spaced points along the upper and rear marginal edge portions of said uprights, a hood of flexible heat reflecting sheet metal extending between said uprights in overlying relation to said rods and having return bent portions at its front and rear ends respectively engaging over the rods at opposite ends of the series of rods, said hood being removable by slightly flexing the return bent end portions to clear the rods at opposite ends of the series of rods, the lowermost rod being located a substantial distance above the bottom of said uprights to provide an open space beneath the end portion of said hood engaging said lowermost rod and between said uprights extending to the bottom of said uprights, a fire pot insertable between said uprights through said opening, and a spit extending between said uprights above said fire pot and beneath said hood.

6. In a barbecue, a pair of laterally spaced uprights providing side walls, a series of spaced mutually parallel rods extending between said uprights and having their opposite ends respectively secured to said uprights at spaced points along the upper and rear marginal edge portions of said uprights, a hood of flexible heat reflecting sheet metal extending between said uprights in overlying relation to said rods and having return bent portions at its front and rear ends respectively engaging over the rods at opposite ends of series of rods, said hood being removable by slightly flexing the return bent end portions to clear the rods at opposite ends of the series of rods, the lowermost rod being located a substantial distance above the bottom of said uprights to provide an open space beneath the end portion of said hood engaging said lowermost rod and between said uprights extending to the bottom of said uprights, a fire pot insertable between said uprights through said opening, a spit extending between said uprights above said fire pot, generally horizontal slots in said uprights open at the front of said uprights and extending rearwardly in substantial alignment with each other, a plurality of notches in the bottoms of said slots for selectively rotatably receiving the opposite ends of said spit, a motor mounted on one of said uprights having a driving wheel, a driven wheel fixed on one end of said spit in driving engagement with said driving wheel, said slots being circular and the notches in each slot being disposed in a circular array having its center of curvature coincident with the axis of said driving wheel.

7. Structure as defined in claim 6, having a drip tray reversibly and removably supported beneath said spit, said tray having a lip extending outwardly from one of its front and rear edges.

8. In a barbecue, frame structure including a pair of laterally spaced uprights, an elongated spit extending between said uprights, supporting means on said uprights for removably supporting opposite ends of said spit in selected positions of adjustment, said supporting means comprising a plurality of spaced supports on each upright, the supports on one upright being respectively aligned with the supports on the other upright for rotatably receiving the ends of said spit, means for rotating said spit including a driving wheel mounted on said frame structure, a driven wheel fixed on one end of said spit with its periphery in driving engagement with said driving wheel, the supports of each upright being disposed in a circular array having its center of curvature coincident with the axis of said driving wheel.

9. The structure defined in claim 8 in which said means for rotating the spit comprises a power unit mounted on one of said uprights, said power unit including said driving wheel.

10. In a barbecue, a pair of laterally spaced uprights providing side walls, a series of spaced, mutually parallel rods extending between said uprights and having their opposite ends respectively removably secured to said uprights at spaced points along the upper and rear marginal edge portions of said uprights, a hood of heat reflecting sheet material extending between said uprights in overlying relation to said rods and having means at its front and rear ends respectively removably engageable with the rods at opposite ends of the series of rods, and a spit extending between said uprights beneath said hood.

References Cited in the file of this patent

UNITED STATES PATENTS

| | | |
|---|---|---|
| 1,085,671 | Day | Feb. 3, 1914 |
| 1,476,215 | Pace | Dec. 4, 1923 |
| 1,595,846 | Wood | Aug. 10, 1926 |
| 1,630,644 | Troiel | May 31, 1927 |
| 2,012,520 | Rogers | Aug. 27, 1935 |
| 2,012,811 | Duffy | Aug. 27, 1935 |
| 2,205,160 | Trackwell | June 18, 1940 |
| 2,608,190 | Winning et al. | Aug. 26, 1952 |
| 2,635,529 | Nisenson | Apr. 21, 1953 |